United States Patent
Prud'Homme-Lacroix et al.

(10) Patent No.: US 8,523,104 B2
(45) Date of Patent: Sep. 3, 2013

(54) METHOD AND A ROTARY WING AIRCRAFT THAT ARE OPTIMIZED SO AS TO MINIMIZE THE CONSEQUENCES FOR THE OCCUPANTS OF SAID AIRCRAFT OF AN OFF-SPECIFICATION EMERGENCY LANDING

(75) Inventors: Pierre Prud'Homme-Lacroix, Vitrolles (FR); Olivier Bistuer, La Fare les Oliviers (FR)

(73) Assignee: Eurocopter, Marignane Cedex (FR)

( * ) Notice: Subject to any disclaimer, the term of this patent is extended or adjusted under 35 U.S.C. 154(b) by 291 days.

(21) Appl. No.: 13/167,138

(22) Filed: Jun. 23, 2011

(65) Prior Publication Data
US 2012/0006934 A1 Jan. 12, 2012

(30) Foreign Application Priority Data
Jun. 28, 2010 (FR) ...................... 10 02693

(51) Int. Cl.
*B64C 27/00* (2006.01)

(52) U.S. Cl.
USPC ......................................... 244/17.27; 244/54

(58) Field of Classification Search
USPC ..................... 244/17.15, 17.27, 54
See application file for complete search history.

(56) References Cited

U.S. PATENT DOCUMENTS

| | | | | |
|---|---|---|---|---|
| 5,154,371 A | * | 10/1992 | Grant et al. | 244/17.27 |
| 7,198,224 B2 | * | 4/2007 | Townsend et al. | 244/17.11 |
| 2006/0032973 A1 | | 2/2006 | Drost | |

FOREIGN PATENT DOCUMENTS

| | | |
|---|---|---|
| EP | 0488845 A1 | 6/1992 |
| EP | 1291545 A1 | 3/2003 |
| EP | 1395488 A1 | 3/2004 |
| FR | 1507306 A | 12/1967 |
| FR | 2474996 A1 | 8/1981 |
| FR | 2492933 A1 | 4/1982 |
| FR | 2777860 A1 | 10/1999 |

OTHER PUBLICATIONS

Search Report and Written Opinion; Application No. FR 1002693; dated Feb. 17, 2011.

* cited by examiner

*Primary Examiner* — Timothy D Collins
*Assistant Examiner* — Brian M O'Hara
(74) *Attorney, Agent, or Firm* — Brooks Kushman P.C.

(57) ABSTRACT

A method of minimizing the consequences for the occupants of a rotary wing aircraft (1, 10) of an off-specification landing with forward and/or downward acceleration vectors. The aircraft (1, 10) extends along an anteroposterior longitudinal plane of symmetry (4) in elevation separating a first side (5) of said aircraft (1) from a second side (6) thereof. Said rotary wing (10) comprises at least one rotor (11) driven in rotation by a main gearbox (20) and being provided with a plurality of blades (12). Said main gearbox (20) being fastened to a structure (30) of said aircraft (1) by a plurality of fastener elements (40) comprising at least one first fastener element (51, 52) disposed on said first side (5) and at least one second fastener element (61, 62) disposed on said second side (6). Said first and second fastener elements (51, 52, 61, 62) are dimensioned differently so that the strength of said at least one first fastener element (51, 52) is greater than the strength of said at least one second fastener element (61, 62).

6 Claims, 2 Drawing Sheets

METHOD AND A ROTARY WING AIRCRAFT THAT ARE OPTIMIZED SO AS TO MINIMIZE THE CONSEQUENCES FOR THE OCCUPANTS OF SAID AIRCRAFT OF AN OFF-SPECIFICATION EMERGENCY LANDING

CROSS REFERENCE TO RELATED APPLICATIONS

This application claims the benefit of FR 10 02693 filed on Jun. 28, 2010, the disclosure of which is incorporated in its entirety by reference herein.

BACKGROUND OF THE INVENTION (1) Field of the Invention

The present invention relates to a method and to a rotary wing aircraft that are optimized so as to minimize the consequences for the occupants of said aircraft to an off-specification emergency landing including positive acceleration in a direction going from the rear end of the aircraft towards its front end and/or downwards, i.e. in a direction going from the rotary wing towards the ground.

(2) Description of Related Art

Such an aircraft has a rotary wing provided with at least one rotor that provides at least some of the lift of the aircraft, and that may also propel said aircraft if it is a helicopter.

A rotary wing then includes a plurality of blades. The person skilled in the art uses the term "advancing blade" for each blade that is advancing relative to the movement in translation of the aircraft, and uses the term "retreating blade" for each blade that is retreating relative to the movement of translation of the aircraft. Thus, depending on its azimuth position, over one-half revolution a blade is to be found in an advancing blade position, while over the next half-revolution said blade is to be found in a retreating blade position.

For convenience, and in the text below, it is assumed that the left of an aircraft is on the left of an individual who is sitting on the anteroposterior longitudinal plane of symmetry of the aircraft with the individual's back towards the rear of the aircraft so that the individual is looking towards the front of the aircraft. This amounts to considering that the right side of the aircraft is on the right-hand side of said individual.

Under such circumstances, when the rotor blades rotate in a clockwise direction when seen from above, the blades on the left of said individual are blades in an advancing position while the blades on the right of the individual are blades in a retreating position. Each blade passes in alternation from having the status of a blade in the advancing position to a status of a blade in the retreating position. Naturally, this effect is inverted if the rotor turns counterclockwise.

Conventionally, a rotary wing rotor is driven in rotation by a main gearbox, sometimes referred to by the acronym "MGB", the main gearbox being driven by a power plant.

The main gearbox is then fastened to the structure of the aircraft by fastener elements.

The term "fastener element" is used to designate a member or a set of members that connect the main gearbox to the airframe.

For example, a fastener element may comprise a fastener bar and means for fastening said fastener bar firstly to the main gearbox and secondly to the airframe.

A fastener element may also be a portion of an element for transmitting torque. For example, one such element includes at least two fastener elements.

It can be understood that this list is not exhaustive, and that elements for fastening a main gearbox are nevertheless known to the person skilled in the art.

In one variant, the aircraft has four fastener elements, two front fastener elements and two rear fastener elements, for example, the front fastener elements being disposed symmetrically on either side of said anteroposterior longitudinal plane of symmetry, the rear fastener elements being disposed symmetrically on either side of said anteroposterior longitudinal plane of symmetry.

In another variant, the aircraft has three fastener elements, namely, by way of example: a front fastener element located close to or in the anteroposterior longitudinal plane of symmetry; and two rear fastener elements disposed symmetrically on either side of said anteroposterior longitudinal plane of symmetry; or indeed a rear fastener element disposed close to or in the anteroposterior longitudinal plane of symmetry, and two front fastener elements disposed symmetrically on either side of said anteroposterior longitudinal plane of symmetry.

Independently of the variant, in flight, the fastener elements transmit the lift of the rotor and the forces generated by said rotor to the structure of the aircraft. On the ground, the fastener elements then transmit the weight of the rotor plus the main gearbox to the structure of the aircraft.

With reference to document FR 2 474 996, the fastener elements may comprise a plurality of hinged oblique bars sometimes referred to as "suspension bars" or "MGB bars".

Document FR 2 492 933 describes fastener elements for suspending a gearbox from a structure. Similarly, documents FR 1 507 306, US 2006/032973, FR 2 777 860, and EP 1 395 488 describe fastener elements for main gearboxes. Documents EP 1 291 545 and EP 0 488 845 are also known.

During an emergency landing, the impact that results from the aircraft making contact with a contact surface subjects the heavy members of the aircraft to accelerations, and in particular subjects the main gearbox to accelerations.

Regulations for certifying aircraft define the accelerations that should be taken into account when dimensioning the behavior of said heavy members during such emergency landings.

Under such circumstances, each fastener element is dimensioned so as to present strength in its own failure mode that enables it to withstand the emergency landing conditions as prescribed by said regulations, possibly with an additional safety margin or safety coefficient. This strength is referred to as the "prescribed strength" for convenience, for example a buckling prescribed strength for a fastener element that is stressed in compression.

For convenience, it should be observed that below the term "prescribed emergency landing conditions" is used to designate both emergency landing conditions as defined by certification regulations and also prescribed emergency landing conditions as such plus a safety margin added by the manufacturer, where applicable. Under such circumstances, the emergency landing conditions defined by the certification regulations, with or without any extra applied by the manufacturer, are referred to for convenience as "prescribed emergency landing conditions".

Furthermore, emergency landing conditions that are not covered by said certification regulations are, in contrast, referred to as "off-specification emergency landing conditions".

During an emergency landing with positive acceleration equally well in a direction going from the rear end towards the front end of the aircraft and/or downwards going from the rotary wing towards the ground, the mechanical assemblies including the power plant, the main gearbox, and the rotor tend to move towards the front end of the aircraft under the effect of the impact. This forward movement is nevertheless restrained by the fastener elements.

However, during an off-specification emergency landing, i.e. a landing presenting conditions that are more penalizing than the prescribed emergency landing conditions used by the manufacturer for dimensioning those fastener elements, it is possible that the fastener elements will break.

The main gearbox will then tend to tilt forwards or towards the side of the aircraft where the blades are in the advancing position, for example. As a result, the blades of the rotary wing are in danger of coming into contact with the ground. This can sometimes lead to the members that provide the blades with stiffness in flapping and in drag being broken. As a result of that, a blade coming into contact with the ground runs the risk of being caused to make very large movements that may cause it to come into collision with the cabin of the aircraft or with some other structural element of the aircraft, such as its tail boom.

More precisely, the blades in the advancing position run the risk of impacting against the cockpit, while the blades in the retreating position run the risk of coming into collision with the tail boom, for example.

Although a collision between a blade and the tail boom is likely to give rise a priori to damage that is purely structural, it will readily be understood that such contact between a blade and the cabin of the aircraft is unfortunately likely to injure the occupants of the cockpit.

Thus, in off-specification emergency landing conditions that are not specified by certification regulations, an accident may lead to a blade coming into collision with the cabin of the aircraft.

Pilots therefore naturally tend to cause the aircraft to roll towards the side having blades in the retreating position so as to avoid such a collision.

SUMMARY OF THE INVENTION

An object of the present invention is thus to propose a method and a device seeking to minimize the consequences of an off-specification emergency landing for the occupants of said aircraft, by reducing the risks of a blade in the advancing position impacting against the cockpit of the aircraft.

According to the invention, a method of minimizing the consequences of an off-specification emergency landing for the occupants of a rotary wing aircraft extending from a front end towards a rear end along an anteroposterior longitudinal plane of symmetry in elevation separating a first side of said aircraft from a second side thereof, the emergency landing producing positive acceleration in a direction going from said rear end towards said front end and/or downwards, said rotary wing including at least one rotor driven in rotation by a main gearbox about an axis of rotation, said rotor being provided with a plurality of blades, each blade being in an advancing position when it is on said first side relative to said longitudinal plane, moving from the rear end towards the front end, and each blade being in a retreating position when it is on said second side relative to said longitudinal plane, moving from the front end towards the rear end, said main gearbox being fastened to a structure of said aircraft by a plurality of fastener elements comprising at least one first fastener element disposed on said first side relative to said longitudinal plane and at least one second fastener element disposed on said second side relative to said longitudinal plane, is remarkable in particular in that the first and second fastener elements are dimensioned differently so as to ensure that one of the fastener elements breaks after the other fastener element, thereby causing the main gearbox to tilt towards the second side during an off-specification emergency landing taking place under conditions lying outside the prescribed emergency landing conditions as defined by certification regulations.

It is recalled that prescribed emergency landing conditions are given, where appropriate, either by the emergency landing conditions such as those imposed by said regulations, or else emergency landing conditions such as those imposed by said regulations plus a margin added by the manufacturer.

Consequently, the strength of the fastener elements is not symmetrical about the longitudinal plane. It can be understood that this characteristic maximizes the probability of the main gearbox tilting towards the second side of the aircraft, i.e. towards its side where the blades are in the retreating position.

This tends to cause the blades in the retreating position to come into contact with the contact surface so as to avoid the blades in the advancing position making contact therewith since that would endanger the occupants of the aircraft.

Thus, the method seeks to minimize the probability of the main gearbox tilting towards the front or towards the first side where such movements are likely to be very dangerous.

The asymmetry in the strength of the fastener elements resulting from the invention tends, on the contrary, to encourage the main gearbox to tilt towards the second side.

The method may include one or more of the following characteristics.

The strength in its failure mode of a fastener element that is to break first is dimensioned so as to withstand the forces to which it is subjected during the prescribed emergency landing conditions, with the strength in its failure mode of the other fastener element that is to break second being greater than the strength needed for withstanding the forces to which it is subjected during the prescribed emergency landing conditions.

For example, the strengths of the set of fastener elements in their respective failure modes may be dimensioned to a given value for withstanding at least the conditions of a prescribed emergency landing. In addition, the strength of the fastener elements that are to break second is increased relative to said given value.

Consequently, the fastener elements that are to break first are dimensioned in conventional manner, and in contrast the strength of the fastener elements that are to break second is increased relative to a strength that is theoretically sufficient to withstand the forces to which they are subjected during prescribed emergency landing conditions.

Under such circumstances, normal operation under prescribed emergency landing conditions is guaranteed.

Depending on the arrangement of the fastener elements, one and/or another of the fastener elements is/are overdimensioned in traction or in compression or in shear, for example, in order to obtain the looked-for results.

In a first variant, the fastener elements include a front second fastener element situated on the second side between the axis of rotation and the front end, and the front second fastener element is dimensioned to withstand the forces generated by the positive acceleration as applied in particular to the gearbox and to which it is subjected during the prescribed emergency landing conditions, the front second fastener element breaking first in order to cause the main gearbox to tilt towards the second side during an off-specification landing.

It can be understood that throughout the description the terms "front" and "rear" relate to the front and rear ends of the aircraft which are well defined for the person skilled in the art, so that a fastener element that is said to be "front" fastener element lies between the front end of the aircraft and the axis of rotation of the rotor, and a fastener element that is said to be a "rear" fastener element lies between the rear end of the aircraft and said axis of rotation.

Optionally, the strength in its failure mode of the front second fastener element is dimensioned to withstand the forces to which it is subjected during prescribed emergency landing conditions, while the strengths of the other fastener elements that are to break second are dimensioned in their respective failure modes to be greater than the strength needed to withstand the forces to which they are subjected during prescribed emergency landing conditions.

In a second variant that is compatible with the first variant, the fastener elements include a rear first fastener element situated on the first side between the axis of rotation and the rear end, and the rear first fastener element is dimensioned to withstand, in its failure mode, the forces generated by said positive acceleration as applied in particular to the gearbox and to which it is subjected during the prescribed emergency landing conditions, the rear first fastener element breaking to cause the main gearbox to tilt towards the second side during said off-specification landing, said rear first fastener element breaking first, i.e. before the other fastener elements so as to give rise to said tilting.

Optionally, the strength in its failure mode of the rear second fastener element that is to break first is dimensioned to withstand the forces to which it is subjected during prescribed emergency landing conditions, with the strength of the fastener elements that are to break second in their failure modes being greater than the strength needed to withstand the forces to which they are subjected during prescribed emergency landing conditions.

In a third variant that is compatible with the preceding variant, the fastener elements include a front first fastener element situated on the first side between said axis of rotation and said front end and a front second fastener element situated on the second side between said axis of rotation and said front end disposed on either side of said longitudinal plane, the strength in its failure mode of the front first fastener element when subjected to forces generated by said positive acceleration applied in particular to said gearbox is greater than the strength in its failure mode of the second fastener element when subjected to forces generated by said positive acceleration as applied in particular to said gearbox.

Optionally, the strength of the front second fastener element that is to break first in its failure mode is dimensioned to withstand the forces generated by a movement of the gearbox towards the front end when subjected to said prescribed emergency landing conditions, the strength in its failure mode of the front first fastener element that is to break second being greater than the strength it needs to withstand the forces to which it is subjected during prescribed emergency landing conditions.

In a fourth variant compatible with the preceding variants, the fastener elements include a rear first fastener element situated on the first side between said axis of rotation and said rear end, and a rear second fastener element situated on the second side between said axis of rotation and said rear end, the rear fastener element being disposed on either side of said longitudinal plane, the strength in its failure mode of the rear second fastener elements when subjected to the forces generated by said positive acceleration applied to said gearbox being greater than the strength in its failure mode of the rear first fastener element when subjected to the forces generated by said positive acceleration applied to said gearbox.

Thus, the strength of the rear second fastener element in its failure mode when subjected to forces generated by a movement of said gearbox towards the front end is greater than the strength of the rear first fastener element in its failure mode when subjected to forces generated by a movement of said gearbox towards the front end.

In addition to a method, the invention provides a rotary wing aircraft extending from a front end towards a rear end along an anteroposterior longitudinal plane of symmetry in elevation separating a first side of the aircraft from a second side thereof, the rotary wing comprising at least one rotor driven in rotation about an axis of rotation by a main gearbox, the rotor being provided with a plurality of blades, each blade being in an advancing position when it is on the first side relative to the longitudinal plane, moving from the rear end towards the front end, and each blade being in a retreating position when it is on the second side relative to the longitudinal plane, moving from the front end towards the rear end, the main gearbox being fastened to a structure of the aircraft by a plurality of fastener elements comprising at least one first fastener element disposed on the first side relative to the longitudinal plane and at least one second fastener element disposed on the second side relative to the longitudinal plane.

This aircraft is remarkable in that it implements the method of the invention, the strength of a fastener element in its failure mode differs from the strength of the other fastener element in its failure mode so as to encourage the gearbox to tilt towards the second side during an off-specification emergency landing taking place under conditions going beyond the prescribed emergency landing conditions defined by certification regulations, and more generally to encourage tilting of the mechanical assemblies comprising in particular the power plant, the main gearbox, and the rotor.

Furthermore, it should be observed that said fastener elements may comprise suspension bars, or any other element for holding the mechanical assemblies on the structure.

BRIEF DESCRIPTION OF THE DRAWINGS

The invention and its advantages appear in greater detail from the following description of embodiments given by way of illustration and with reference to the accompanying figures, in which.

DETAILED DESCRIPTION OF THE PREFERRED EMBODIMENT

Elements that are present in more than one of the figures are given the same references in each of them.

Three mutually orthogonal directions X, Y, and Z are shown in the figures.

The direction X is said to be "longitudinal". The term "length" relates to a longitudinal dimension of the aircraft shown having this longitudinal direction X.

Another direction Y is said to be "transverse". The term "width" relates to a transverse dimension of the aircraft along this transverse direction.

Finally, a third direction Z is said to be in "elevation" and corresponds to the height dimensions of the structures described. The term "height" thus relates to a dimension in elevation of the aircraft in said elevation direction.

Figure 1:
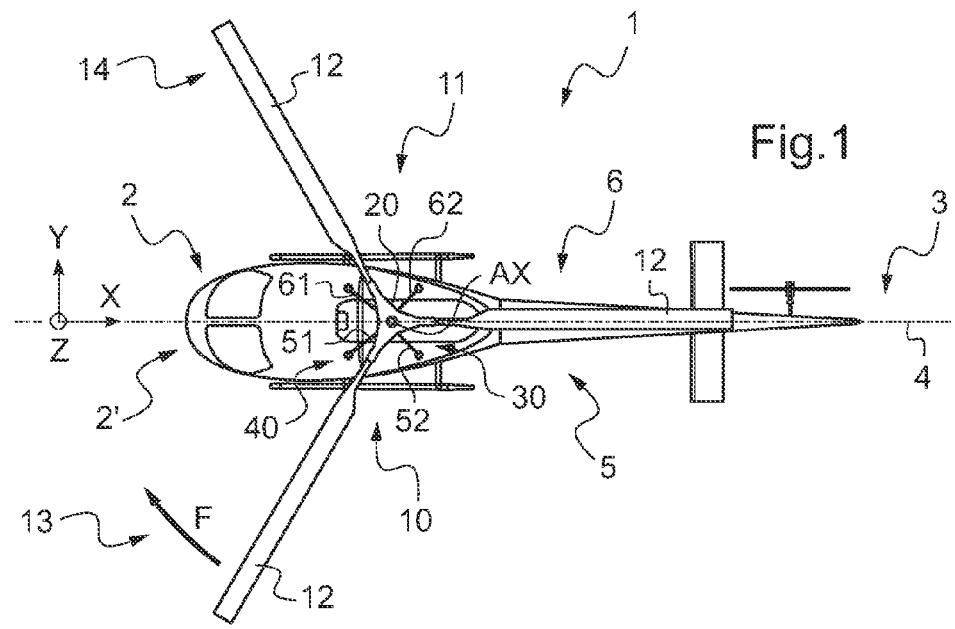
FIG. 1 is a plan view of an aircraft illustrating a first variant of the invention.

FIG. 1 shows an aircraft 1 of the invention extending from a front end 2 to a rear end 3 in the longitudinal direction X along an anteroposterior longitudinal plane of symmetry 4 in elevation, referred to below for convenience as the "longitudinal plane".

The aircraft 1 extends more precisely from a nose 2' towards a tail boom, the longitudinal plane 4 separating a first side 5 of the aircraft 1 from a second side 6 of said aircraft.

Furthermore, the aircraft 1 includes a rotary wing 10 provided with at least one rotor 11 having a plurality of blades 12, by way of example the aircraft 1 is a helicopter. The rotor 11 is driven in rotation by a power plant via a main gearbox 20 arranged in the fuselage of the aircraft 1.

The main gearbox 20 is fastened by fastener elements 40 to a structure of the airframe of the aircraft, a floor that for convenience is referred to as the transmission support platform, for example. It can be understood that the power gearbox 20 and the fastener elements are normally not visible when looking at the aircraft 1 from above because of the presence of covers, but they are nevertheless shown in FIG. 1 for the purpose of explaining the invention.

Under drive from the power plant and passing via the main gearbox, each blade 12 thus performs rotation about the axis of rotation of the rotor, passing in alternation from a substantially semicircular portion during which the blade is in an advancing position 13 to a substantially semicircular portion during which the blade is in a retreating position 14. More precisely, when the blade is on the first side 5 of the aircraft 1, then it is a blade in the advancing position 13, while a blade that is on the second side 6 of the aircraft 1 is a blade in the retreating position 14.

For example, when the rotor 11 rotates clockwise as seen from above and as shown by arrow F in FIG. 1, the first side is on the left of the longitudinal plane 4 as seen from above, while the second side is situated on the right of the longitudinal plane 4 as seen from above. Conversely, if the rotor 11 rotates in the counterclockwise direction when seen from above, then the first side is on the right of the longitudinal plane 4 when seen from above and the second side is situated on the left of the longitudinal plane 4 when seen from above.

Furthermore, the plurality of fastener elements 40 comprises at least one first fastener element 51, 52 situated on the first side 5 of the aircraft 1, and at least one second fastener element 61, 62 situated on the second side 6.

In accordance with the method of the invention, in order to minimize the risk of a blade in the advancing position impacting with a contact surface during an off specification landing giving rise to positive accelerations equally well either towards the front going from the rear end to the front end of the aircraft or downwards going from the rotary wing towards the ground, or forwards and downwards simultaneously, the first and second fastener elements are dimensioned differently. Thus, one first and one second fastener element optionally disposed symmetrically on either side of the longitudinal plane 4 presents different strengths.

More precisely, the first and second fastener elements are given different dimensions in order to ensure that one of the fastener elements breaks after the other fastener element, thereby causing the gearbox to tilt towards the second side during an off-specification landing taking place under conditions going beyond the prescribed emergency landing conditions set down by certification regulations. It is recalled that prescribed emergency landing conditions include emergency landing conditions imposed as such by the certification regulations, and also emergency landing conditions imposed as such by certification regulations plus a margin added by the manufacturer for safety reasons.

Consequently, it is preferred for the main gearbox 20 to tilt towards the second side 6 at the moment of an impact in order to avoid a blade in the advancing position making an impact with a contact surface, since that is potentially dangerous.

In order to guarantee good operation under normal conditions, i.e. prescribed emergency landing conditions, it is possible initially to dimension all of the fastener elements so that they withstand the forces generated by prescribed emergency landing conditions. Thereafter, depending on their failure modes, the strengths of the fastener elements that are to break later during an off-specification landing are increased so that the strengths of the fastener elements that are to break second are greater than a threshold strength that enables said induced forces to be withstood. Consequently, said fastener elements that are to break second are overdimensioned.

Figure 2:
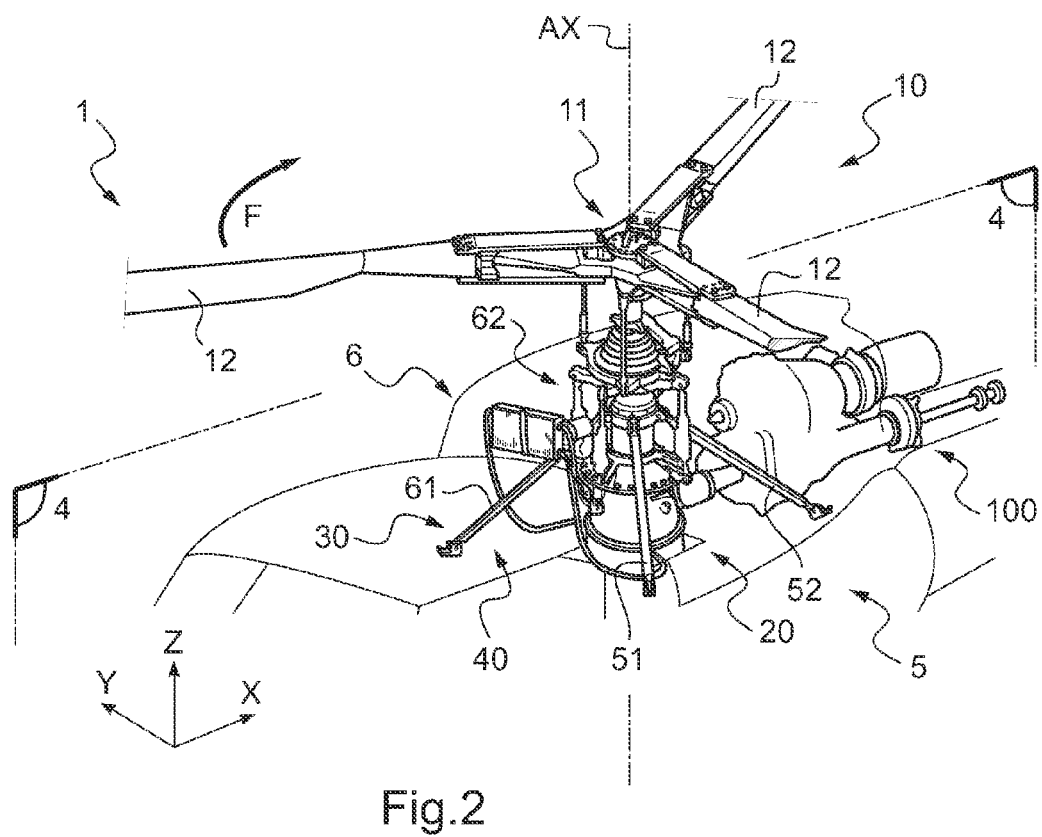
FIG. 2 is a view of the main gearbox of a first variant of the invention.

FIG. 2 is a diagrammatic view of fastener elements 40 in a first embodiment of the invention, FIG. 2 also showing the power plant 100 that drives the main gearbox 20.

In this first embodiment, the fastener elements comprise a front first fastener element 51, a rear first fastener element 52, a front second fastener element 61, and a rear second fastener element 62 that is hidden behind the main gearbox 20 in FIG. 2.

The front first and second fastener elements 51 and 61 are disposed substantially symmetrically about the longitudinal plane 4 with the rear first and second fastener elements 52 and 62 being disposed substantially symmetrically about the longitudinal plane 4.

It should be observed that the fastener elements 40 are oblique suspension bars in FIG. 2. Nevertheless, other embodiments could be envisaged.

Under such circumstances, the strengths of the front first fastener element 51 and of the rear second fastener element 62 are dimensioned so that they are stronger than the strengths of the front second fastener element 61 and the rear first fastener element 51.

For example, when the fastener elements are bars working in compression as a result of positive acceleration forwards and/or downwards relative to the mechanical assemblies, the buckling first strength of the front first fastener element 51 when subjected to compression forces is dimensioned so that said first strength is greater than a buckling second strength of the front second fastener element 61 under the effect of compression forces. Thus, during an off-specification landing, the front second fastener element 61 will break before the front first fastener element 51 and thereby cause the mechanical assembly to tilt towards the second side. Similarly, the third strength under the effect of traction forces of the rear second fastener element 62 is dimensioned so that said third strength is greater than a fourth strength under the effect of traction forces of the rear first fastener element 52.

To this end, the strengths of the front second fastener element 61 and of the rear first fastener element 52 may be dimensioned, depending on their failure modes, in order to withstand the forces to which they are subjected during a prescribed emergency landing conditions, with the strengths of the front first fastener element 51 and of the rear second fastener element 62, depending on their failure modes, on the contrary being overdimensioned compared with a threshold strength that is dimensioned to withstand forces during prescribed emergency landing conditions.

Figure 3:
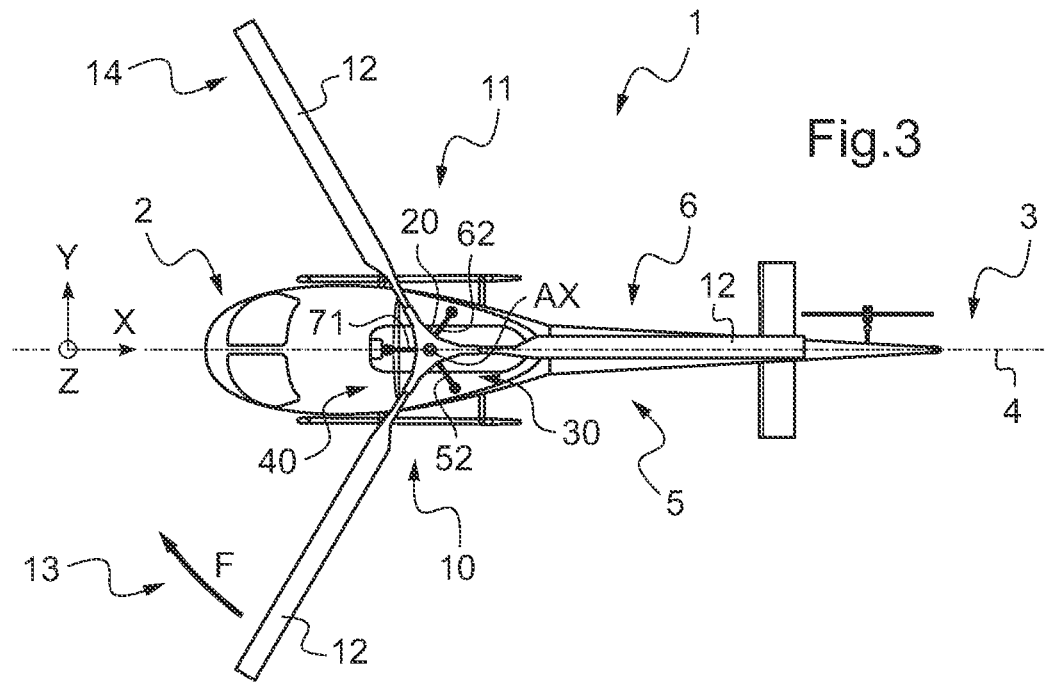
FIG. 3 is a plan view of an aircraft illustrating a second variant of the invention.

FIG. 3 shows a second embodiment.

In this second embodiment, the fastener elements 40 comprise a front central fastener element 71 disposed substantially on the longitudinal plane 4, a rear first fastener element 52, and a rear second fastener element 62. The rear first and second fastener elements 52 and 62 are disposed symmetrically relative to the longitudinal plane 4.

The rear second fastener element 62 is then dimensioned so that its strength in its failure mode under traction forces resulting from mechanical assemblies accelerating towards the front end 2 and/or downwards is greater firstly than the strength of the rear first fastener element 52 in its failure mode under the traction forces that result from the mechanical assemblies accelerating towards the front end 2 and/or downwards, and secondly greater than the strength of the front central fastener element 71 in its failure mode under the compression forces that result from the mechanical assemblies accelerating towards the front end 2 and/or downwards.

Figure 4:
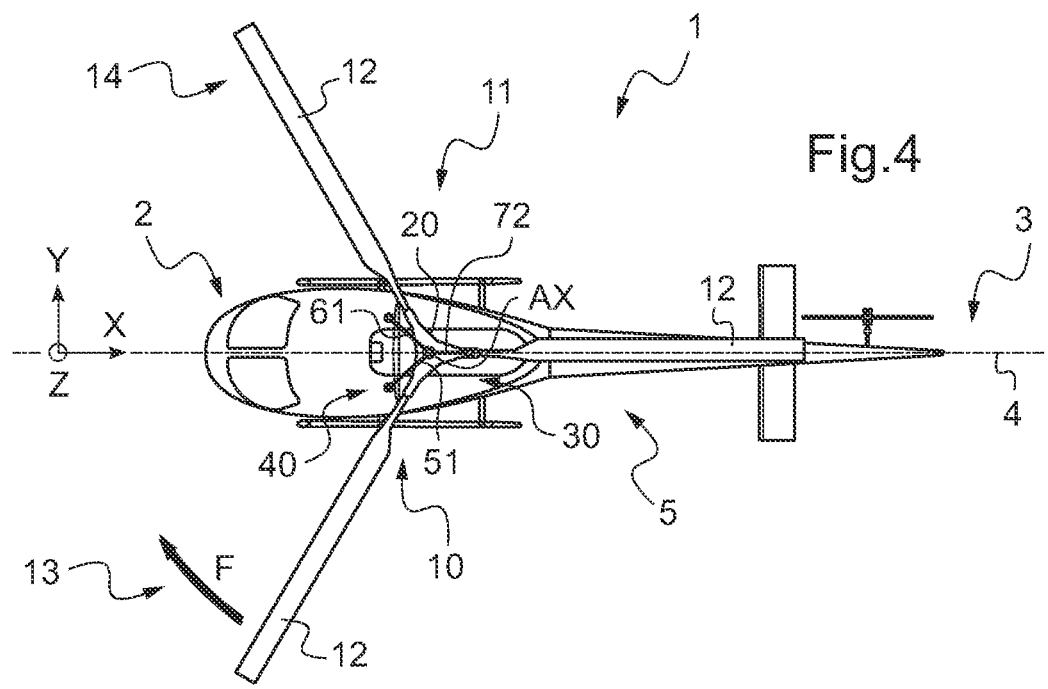
FIG. 4 is a plan view of an aircraft illustrating a third variant of the invention.

FIG. 4 shows a third embodiment.

In this third embodiment, the fastener elements 40 comprise a rear central fastener element 72 lying substantially in the longitudinal plane 4, a front first fastener element 51, and a front second fastener element 61. The front first and second fastener elements 51, 61 are disposed substantially symmetrically about the longitudinal plane 4.

The front first fastener element 51 is then dimensioned so that its strength in its failure mode under the compression forces that result from the mechanical assemblies moving towards the front end 2 is greater firstly than the strength of the front first fastener element 61 in its failure mode under the compression forces that result from the mechanical assemblies accelerating towards the front end 2 and/or downwards, and secondly than the strength of the rear central fastener element 72 in its failure mode under the traction forces that result from the mechanical assemblies acceleration towards the front end 2 and/or downwards.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A method of minimizing the consequences of an off-specification emergency landing for the occupants of a rotary wing aircraft extending from a front end towards a rear end along an anteroposterior longitudinal plane of symmetry in elevation separating a first side of said aircraft from a second side thereof, the emergency landing producing positive acceleration in a direction going from said rear end towards said front end and/or downwards, said rotary wing including at least one rotor driven in rotation by a main gearbox about an axis of rotation (AX), said rotor being provided with a plurality of blades, each blade being in an advancing position when it is on said first side relative to said longitudinal plane, moving from the rear end towards the front end, and each blade being in a retreating position when it is on said second side relative to said longitudinal plane, moving from the front end towards the rear end, said main gearbox being fastened to a structure of said aircraft by a plurality of fastener elements comprising at least one first fastener element disposed on said first side relative to said longitudinal plane and at least one second fastener element disposed on said second side relative to said longitudinal plane, in which method said first and second fastener elements are dimensioned differently so as to ensure that one of said fastener elements breaks after the other fastener element, thereby causing the main gearbox to tilt towards said second side during an off-specification emergency landing taking place under conditions lying outside the prescribed emergency landing conditions as defined by certification regulations.

2. A method according to claim 1, wherein the strength in its failure mode of a fastener element that is to break first is dimensioned so as to withstand the forces to which it is subjected during said prescribed emergency landing conditions, with the strength in its failure mode of the other fastener element (51, 52) that is to break second being greater than the strength needed for withstanding the forces to which it is subjected during said prescribed emergency landing conditions.

3. A method according to claim 1, wherein said fastener elements include a front second fastener element situated on the second side between said axis of rotation and said front end, and said front second fastener element is dimensioned to withstand the forces generated by said positive acceleration to which it is subjected during said prescribed emergency landing conditions, said front second fastener element breaking first in order to cause the main gearbox to tilt towards said second side during said off-specification landing.

4. A method according to claim 1, wherein said fastener elements include a rear first fastener element situated on the first side between said axis of rotation and said rear end, and said rear first fastener element is dimensioned to withstand the forces generated by said positive acceleration to which it is subjected during said prescribed emergency landing conditions, said rear first fastener element breaking to cause the main gearbox to tilt towards said second side during said off-specification landing.

5. A method according to claim 1, wherein said fastener elements include a front first fastener element situated on the first side between said axis of rotation and said front end, and a front second fastener element situated on the second side between said axis of rotation and said front end, said front fastener element being located on either side of said longitudinal plane, and the strength of said front first fastener element when subjected to forces generated by said positive acceleration is greater than the strength of said front second fastener element when subjected to the forces generated by said positive acceleration.

6. A method according to claim 1, wherein said fastener elements include a rear first fastener element situated on the first side between said axis of rotation and said rear end, and a rear second fastener element situated on the second side between said axis of rotation and said rear end, said rear fastener elements being situated on either side of said longitudinal plane, and the strength of the rear second fastener element when subjected to the forces generated by said positive acceleration is greater than the strength of the rear first fastener element when subjected to the forces generated by said positive acceleration.

* * * * *